(12) United States Patent
Satou

(10) Patent No.: US 11,149,142 B2
(45) Date of Patent: Oct. 19, 2021

(54) THERMOPLASTIC RESIN COMPOSITION AND THERMOPLASTIC RESIN MOLDED BODY

(71) Applicant: Mitsubishi Chemical Corporation, Tokyo (JP)

(72) Inventor: Yoshiaki Satou, Tokyo (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 16/626,040

(22) PCT Filed: Mar. 28, 2018

(86) PCT No.: PCT/JP2018/012804
§ 371 (c)(1),
(2) Date: Dec. 23, 2019

(87) PCT Pub. No.: WO2019/003531
PCT Pub. Date: Jan. 3, 2019

(65) Prior Publication Data
US 2020/0115537 A1    Apr. 16, 2020

(30) Foreign Application Priority Data

Jun. 27, 2017   (JP) .............................. JP2017-124982

(51) Int. Cl.
| | | |
|---|---|---|
| *C08L 33/12* | (2006.01) | |
| *C08J 5/18* | (2006.01) | |
| *C08K 5/12* | (2006.01) | |
| *C08K 5/524* | (2006.01) | |
| *C08K 5/527* | (2006.01) | |

(52) U.S. Cl.
CPC ............... *C08L 33/12* (2013.01); *C08J 5/18* (2013.01); *C08K 5/12* (2013.01); *C08K 5/524* (2013.01); *C08K 5/527* (2013.01); *C08J 2333/12* (2013.01); *C08J 2433/12* (2013.01)

(58) Field of Classification Search
CPC ... C08L 33/12; C08L 23/08; C08J 5/18; C08J 5/005; C08J 5/24; C08J 2333/12; C08J 2333/16; C08J 2333/28; C08J 2333/02; C08J 2433/12; C08K 5/12; C08K 5/524; C08K 5/527
See application file for complete search history.

(56) References Cited

U.S. PATENT DOCUMENTS

| | | |
|---|---|---|
| 4,022,942 A | 5/1977 | Anderson et al. |
| 4,508,875 A | 4/1985 | Kishida et al. |
| 5,804,287 A | 9/1998 | Hatakeyama et al. |
| 5,984,658 A | 11/1999 | Shimizu |
| 6,147,162 A | 11/2000 | Tadokoro et al. |
| 6,764,766 B2 | 7/2004 | Kitaike et al. |
| 7,993,562 B2 | 8/2011 | Shi et al. |
| 9,920,148 B2 | 3/2018 | Murakami |
| 10,428,194 B2 | 10/2019 | Okazaki |
| 10,526,433 B2 | 1/2020 | Iwasaki et al. |
| 2003/0032722 A1 | 2/2003 | Kitaike et al. |
| 2006/0110592 A1 | 5/2006 | Doi et al. |
| 2006/0110617 A1 | 5/2006 | Kitaike et al. |
| 2007/0281112 A1 | 12/2007 | Shi et al. |
| 2010/0273019 A1 | 10/2010 | Kitaike et al. |
| 2013/0221293 A1 | 8/2013 | Shirakawa et al. |
| 2013/0237660 A1 | 9/2013 | Iwasaki et al. |
| 2015/0299360 A1 | 10/2015 | Murakami |
| 2015/0322233 A1 | 11/2015 | Iwasaki et al. |
| 2018/0030230 A1 | 2/2018 | Okazaki et al. |

FOREIGN PATENT DOCUMENTS

| | | |
|---|---|---|
| CN | 1375517 A | 10/2002 |
| CN | 103168057 A | 6/2013 |
| CN | 104736373 A | 6/2015 |
| CN | 107250226 A | 10/2017 |
| CN | 101157260 A | 4/2018 |
| EP | 0163742 A1 | 12/1985 |
| EP | 2620473 A1 | 7/2013 |
| JP | S61-000815 U | 1/1986 |
| JP | S62-19309 B2 | 4/1987 |
| JP | S63-08983 B2 | 2/1988 |
| JP | H08-323934 A | 12/1996 |
| JP | H09-263614 A | 10/1997 |
| JP | H10-077384 A | 3/1998 |

(Continued)

OTHER PUBLICATIONS

Johoku product list: JP 308E, 2013.*
XP-002798710, Database WPI Week 199822 Thomson Scientific, London, GB; AN 1998-245670.
Extended Search Report issued in European Patent Application No. 18825513.7 dated May 7, 2020.
International Search Report issued in related International Patent Application No. PCT/JP2018/012804 dated Jun. 12, 2018.
Office Action issued in corresponding Chinese Patent Application No. 201880040764.X dated Jul. 5, 2021.

*Primary Examiner* — Shane Fang

(74) *Attorney, Agent, or Firm* — Morgan, Lewis & Bockius LLP

(57) ABSTRACT

The present invention provides a thermoplastic resin composition having a gel content of 40% by mass or more, comprising: a rubber-containing polymer (A); and a phosphorus-based antioxidant (B) having an alkyl group having 8 or more carbon atoms, wherein a melt flow rate (M1) for a retention time of 4 minutes measured in accordance with JIS K7210 under conditions of a temperature of 280° C. and a load of 49 N is 20 [g/10 min] or more. Even with a high gel content, the thermoplastic resin composition is high in fluidity and thermal stability during molding and easy to handle, and can be stably produced.

13 Claims, No Drawings

(56) References Cited

FOREIGN PATENT DOCUMENTS

| | | | |
|---|---|---|---|
| JP | 2808251 | B2 | 10/1998 |
| JP | H11-147237 | A | 6/1999 |
| JP | H11-209557 | A | 8/1999 |
| JP | 2002-080678 | A | 3/2002 |
| JP | 2002-080679 | A | 3/2002 |
| JP | 2002-241574 | A | 8/2002 |
| JP | 2004-137298 | A | 5/2004 |
| JP | 2005-097351 | A | 4/2005 |
| JP | 2005-139416 | A | 6/2005 |
| JP | 2005-163003 | A | 6/2005 |
| JP | 2006-088081 | A | 4/2006 |
| JP | 2006-143785 | A | 6/2006 |
| JP | 2006-299038 | A | 11/2006 |
| JP | 2006-342358 | A | 12/2006 |
| JP | 2007-254727 | A | 10/2007 |
| JP | 2007-262399 | A | 10/2007 |
| JP | 2008-106252 | A | 5/2008 |
| JP | 2010-017948 | A | 1/2010 |
| WO | 97/28950 | A1 | 8/1997 |

\* cited by examiner

US 11,149,142 B2

THERMOPLASTIC RESIN COMPOSITION AND THERMOPLASTIC RESIN MOLDED BODY

TECHNICAL FIELD

The present invention relates to a thermoplastic resin composition, a thermoplastic resin molded body, and the like.

BACKGROUND ART

A molded body made of acrylic resin is excellent in transparency and has a beautiful appearance and weather resistance, and is therefore widely used in applications such as electrical components, vehicle components, optical components, decorative items, and signboards. In particular, acrylic resin molded bodies made of an acrylic resin composition containing a rubber-containing polymer are widely used.

Such a rubber-containing polymer is produced by, for example, an emulsion polymerization method. Specifically, a polybutadiene latex, a styrene-butadiene copolymer latex, an acrylonitrile-butadiene-styrene copolymer latex, a rubber-containing acrylic graft copolymer latex, or the like is produced by an emulsion polymerization method or the like, and these latexes are subjected to a treatment such as salting out, acid precipitation solidification, spray drying, or freeze drying to separate and recover a powdery polymer. This powdery polymer is usually added with a compounding agent as appropriate, and melt-kneaded by a single screw extruder, twin screw extruder, or the like to be extruded as a strand, and then the strand is cut into pellets by a cold cut method, a hot cut method, or the like. Next, the pellets are fed to an extruder with a T-die, a molding machine, or the like and processed into an acrylic resin molded body.

Film-shaped acrylic resin molded bodies (hereinafter referred to as an "acrylic resin film"), by virtue of their excellent transparency, weather resistance, flexibility, and processability, are laminated on the surfaces of various resin molded products, woodwork products, and metal molded products.

In recent years, as methods of decorating the surface of a resin molded body instead of painting, there have been widely used: a transfer method including inserting a film decorated by printing or the like into an injection mold, and after injection molding, transferring only the decorated layer to the surface of the molded body, and then peeling the film; an insert molding method including leaving a decorated film on the resin molded body as the outermost surface of the molded body; an in-mold molding method including decorating simultaneously with injection molding; a method of laminating a film on the surface of an injection molded body; and the like.

Acrylic resin films are used as those decorative films. When used as protective films for automotive interior and exterior materials, optical materials, construction materials, personal computer materials, and home appliances, the acrylic resin films have a problem that contaminants of 100 μm or more exist in the films. This has significantly limited the use conditions of the above decorative films.

One of known methods of removing contaminants in a film is, for example, a method of filtering using a screen mesh of 200 to 600 mesh in an extrusion step (Patent Literature 1). However, the method using a screen mesh has a problem that the filtration area is small and the strength of the screen mesh itself is low, so that the extrusion discharge rate cannot be increased.

In addition, another known method of removing contaminants in a film is a method of filtering using a leaf disk type polymer filter (Patent Literatures 2 to 6). A leaf disk type polymer filter has a large filtration area, and experiences a small degree of pressure loss even when a highly viscous resin is filtered. However, since the filtration area is increased by connecting leaf disk type filters in series, the residence time is extended, which causes problems that the resin is likely to be thermally deteriorated, and that when the gel content is high, in general, unfavorable situations occur such as increase of defects called fish eyes due to thermally degraded products over time in the resultant molded body.

Meanwhile, in general, when the gel content of a thermoplastic resin composition is low, the fluidity and thermal stability during molding are high, so that the melt viscosity can be kept low and thus the residence in the molding machine is for a short time. As a result, it is possible to suppress the thermal degradation of the resin. When the resultant molded body is a film, unfavorable situations are unlikely to occur such as increase of defects called fish eyes due to thermally degraded products over time, and thus it is possible to perform melt extrusion such as film molding over a long period of time. However, the resultant molded body has a low mechanical strength. When the molded bodies are films, in particular, the films are difficult to handle, and have a problem of being frequently torn or cracked in the process of laminating the films on the surfaces of various three-dimensional resin molded products, woodwork products, or metal molded products directly or after laminated on resin sheets.

CITATION LIST

Patent Literatures

Patent Literature 1: Japanese Patent Application Publication No. Hei 9-263614
Patent Literature 2: Japanese Utility Model Registration Application Publication No. Sho 61-815
Patent Literature 3: Japanese Patent Application Publication No. 2006-88081
Patent Literature 4: Japanese Patent Application Publication No. 2007-254727
Patent Literature 5: Japanese Patent Application Publication No. 2007-262399
Patent Literature 6: Japanese Patent Application Publication No. 2010-17948

SUMMARY OF INVENTION

Problems to be Solved by the Invention

In view of the above, an object of the present invention is to provide a thermoplastic resin composition which has high fluidity and thermal stability during molding and can be stably produced even when the gel content is high. Another object of the present invention is to provide a thermoplastic resin molded body, especially an acrylic resin film, which is excellent in appearance design, high in mechanical strength, and easy to handle, and can be applied to various uses.

Means for Solution of the Problems

It has been found that the above objects are solved by a thermoplastic resin composition which contains a rubber-containing polymer and a phosphorus-based antioxidant having an alkyl group having 8 or more carbon atoms, and has a gel content of 40% by mass or more and a specific melt flow rate.

The present invention provides the following means [1] to [13].

[1] A thermoplastic resin composition having a gel content of 40% by mass or more, comprising:
a rubber-containing polymer (A); and
a phosphorus-based antioxidant (B) having an alkyl group having 8 or more carbon atoms, wherein
a melt flow rate (M1) for a retention time of 4 minutes measured in accordance with JIS K7210 under conditions of a temperature of 280° C. and a load of 49 N is 20 [g/10 min] or more.

[2] The thermoplastic resin composition according to [1], wherein an MFR retention ratio (M2/M1), which is a ratio of an additional melt flow rate (M2) for a retention time of 30 minutes, is 0.8 to 1.2.

[3] The thermoplastic resin composition according to [1] or [2], wherein an MFR retention ratio (M3/M1), which is a ratio of an additional melt flow rate (M3) for a retention time of 60 minutes, is 0.8 to 1.2.

[4] The thermoplastic resin composition according to any one of [1] to [3], further comprising a phenolic antioxidant (C).

[5] The thermoplastic resin composition according to any one of [1] to [4], wherein a heating weight loss (30 min) at 30 minutes after heating to 280° C. in an air atmosphere is 10% by mass or less.

[6] The thermoplastic resin composition according to any one of [1] to [5], wherein a heating weight loss (60 min) at 60 minutes after heating to 280° C. in an air atmosphere is 10% by mass or less.

[7] The thermoplastic resin composition according to any one of [1] to [6], wherein the phosphorus-based antioxidant (B) having an alkyl group having 8 or more carbon atoms is a phosphorus-based antioxidant (B) having no aromatic ring structure.

[8] The thermoplastic resin composition according to any one of [1] to [7], wherein the phosphorus-based antioxidant (B) having an alkyl group having 8 or more carbon atoms is a phosphorus-based antioxidant (B) represented by the following formula (1)

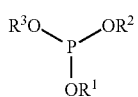

formula (1)

where $R^1$, $R^2$, and $R^3$ each represent an alkyl group having 8 to 18 carbon atoms.

[9] The thermoplastic resin composition according to any one of [1] to [8], further comprising a thermoplastic polymer (D).

[10] The thermoplastic resin composition according to any one of [1] to [9], wherein the thermoplastic resin composition is an acrylic resin composition.

[11] The thermoplastic resin composition according to any one of [1] to [10], wherein an amount added of the phosphorus-based antioxidant (B) having an alkyl group having 8 or more carbon atoms is in a range of 0.1 to 5 parts by mass relative to 100 parts by mass of a total mass of the rubber-containing polymer (A) and the optionally present thermoplastic polymer (D).

[12] The thermoplastic resin composition according to any one of [1] to [11], further comprising the phenolic antioxidant (C), wherein an amount added of the phenolic antioxidant (C) is in a range of 0.2 to 10 parts by mass relative to 100 parts by mass of the total mass of the rubber-containing polymer (A) and the optionally present thermoplastic polymer (D).

[13] The thermoplastic resin composition according to any one of [1] to [11], optionally comprising the thermoplastic polymer (D), wherein a content ratio of the rubber-containing polymer (A) and the thermoplastic polymer (D) is 100:0 to 40:60 (parts by mass).

[14] A thermoplastic resin molded body obtained from the thermoplastic resin composition according to any one of [1] to [13].

[15] The thermoplastic resin molded body according to [14], wherein the thermoplastic resin molded body is a pellet or a film.

[16] An acrylic resin film obtained from the thermoplastic resin composition according to any one of [1] to [13].

Advantageous Effects of Invention

The present invention makes it possible to provide a thermoplastic resin composition which has high fluidity and thermal stability during molding and can be stably produced even when the gel content is high. Furthermore, the present invention makes it possible to provide a thermoplastic resin molded body, especially an acrylic resin film, which is excellent in appearance design, high in mechanical strength, easy to handle, and can be applied to various uses.

DESCRIPTION OF EMBODIMENTS

Hereinafter, embodiments of the present invention are described in detail, but the scope of the present invention is not limited to their descriptions, and modifications other than the following examples can be made as appropriate without departing from the spirit of the present invention.

<Thermoplastic Resin Composition>

A thermoplastic resin composition according to the present invention contains a rubber-containing polymer (A) and a phosphorus-based antioxidant (B) having an alkyl group having 8 or more carbon atoms, and may further contain a phenolic antioxidant (C) and may further contain a thermoplastic polymer (D).

The gel content of the thermoplastic resin composition is 40% by mass or more, and is preferably 40% by mass or more and 80% by mass or less, more preferably 51% by mass or more and 70% by mass or less, and further preferably 55% by mass or more and 65% by mass or less.

When the gel content of the thermoplastic resin composition of the present invention is 40% by mass or more, the resultant molded body is high in mechanical strength and easy to handle. In particular, when the molded body is a film, it can be easily laminated on the surface of various three-dimensional resin molded products, woodwork products, or metal molded products directly or after laminated on a resin sheet, and is also excellent in design.

The gel content of the thermoplastic resin composition is preferably 80% by mass or less because the fluidity and thermal stability during molding do not become too low and the melt viscosity can be kept lower, so that the residence in the molding machine can be reduced to suppress the thermal degradation of the resin. When the resultant molded body is a film, unfavorable situations are unlikely to occur such as increase of defects called fish eyes due to thermally degraded products over time, and thus it is possible to perform melt extrusion such as film molding over relatively a long period of time.

Here, the gel content of the thermoplastic resin composition can be obtained by calculating the following formula $$G=(m/M)\times 100,$$

where G (%) represents the gel content of the thermoplastic resin composition, M represents a predetermined amount (also referred to as pre-extraction mass) of the thermoplastic resin composition mass, and m represents the mass (also referred to as post-extraction mass) of the acetone-insoluble matter of that predetermined amount of the thermoplastic resin composition.

More specifically, m is obtained when the thermoplastic resin composition at a concentration of 1 g/100 mL is dissolved in acetone, refluxed at 65° C. for 4 hours, and centrifuged, and the remaining solid is subjected to reflux, centrifugation, and decantation again, and the resulting solid is dried at 50° C. for 24 hours.

Regarding the melt flow rate of the thermoplastic resin composition, the melt flow rate (M1) for a retention time of 4 minutes measured in accordance with JIS K7210 (Method A) under conditions of a temperature of 280° C. and a load of 49 N is 20 [g/10 min] or more. The melt flow rate (M1) is preferably 23 [g/10 min] or more, and more preferably 26 [g/10 min] or more.

When the melt flow rate (M1) of the thermoplastic resin composition of the present invention is 20 [g/10 min] or more, the fluidity during molding is high and thus the melt viscosity can be kept low, and the residence in the molding machine is small and thus the thermal degradation of the resin can be suppressed. When the resultant molded body is a film, unfavorable situations are unlikely to occur such as increase of defects called fish eyes due to thermally degraded products over time, and thus it is possible to perform melt extrusion such as film molding over a long period of time.

The MFR retention ratio (M2/M1) of the thermoplastic resin composition is calculated as a ratio between the melt flow rate (M2) for a retention time of 30 minutes and the melt flow rate (M1) for a retention time of 4 minutes measured in accordance with JIS K7210 (Method A) under conditions of a temperature of 280° C. and a load of 49 N. The MFR retention ratio (M2/M1) is preferably in the range of 0.8 to 1.2, more preferably in the range of 0.85 to 1.15, and further preferably in the range of 0.9 to 1.1.

The MFR retention ratio (M2/M1) is preferably 0.8 or more because the thermal stability during molding can be more enhanced to keep lower the increase in melt viscosity due to the thermal degradation of the resin, and the residence in the molding machine can be reduced to suppress the thermal degradation of the resin. When the resultant molded body is a film, unfavorable situations are unlikely to occur such as increase of defects called fish eyes due to thermally degraded products over time, and thus it is possible to perform melt extrusion such as film molding over a long period of time.

The MFR retention ratio (M2/M1) is preferably 1.2 or less because the thermal stability during molding can be more enhanced to keep the thermal decomposition of the resin lower, and to suppress the thermal degradation of the resin due to side reactions. When the resultant molded body is a film, unfavorable situations are unlikely to occur such as increase of defects called fish eyes due to thermally degraded products over time, and thus it is possible to perform melt extrusion such as film molding over a long period of time.

In the case of filtration using a leaf disk type polymer filter as a method of removing contaminants in the film, the resin tends to be thermally degraded due to an increase in residence time during molding. Therefore, longer-term thermal stability is required.

The MFR retention ratio (M3/M1) of the thermoplastic resin composition is calculated as a ratio between the melt flow rate (M3) for a retention time of 60 minutes and the melt flow rate (M1) for a retention time of 4 minutes measured in accordance with JIS K7210 (Method A) under conditions of a temperature of 280° C. and a load of 49 N. The MFR retention ratio (M3/M1) is preferably in the range of 0.8 to 1.2, more preferably in the range of 0.85 to 1.15, and further preferably in the range of 0.9 to 1.1.

The MFR retention ratio (M3/M1) is preferably 0.8 or more because the thermal stability during molding can be more enhanced to keep lower the increase in melt viscosity due to the thermal degradation of the resin, and the residence in the molding machine can be reduced to suppress the thermal degradation of the resin. Particularly in the case of filtration using a leaf disk type polymer filter as a method of removing contaminants in the film, unfavorable situations are unlikely to occur such as increase of defects called fish eyes due to thermally degraded products over time, and thus it is possible to perform melt extrusion such as film molding over a long period of time.

The MFR retention ratio (M3/M1) is preferably 1.2 or less because the thermal stability during molding can be more enhanced to keep the thermal decomposition of the resin lower, and to suppress the thermal degradation of the resin due to side reactions. Particularly in the case of filtration using a leaf disk type polymer filter as a method of removing contaminants in the film, unfavorable situations are unlikely to occur such as increase of defects called fish eyes due to thermally degraded products over time, and thus it is possible to perform melt extrusion such as film molding over a long period of time.

Regarding the heating weight loss (30 min) of the thermoplastic resin composition, the heating weight loss at 30 minutes after heating to 280° C. in an air atmosphere is preferably 10% by mass or less, more preferably 8% by mass or less, and further preferably 6% by mass or less.

The heating weight loss (30 min) is preferably 10% by mass or less because the thermal stability during molding can be more enhanced to keep the thermal decomposition of the resin lower, and to suppress the thermal degradation of the resin due to side reactions. When the resultant molded body is a film, unfavorable situations are unlikely to occur such as increase of defects called fish eyes due to thermally degraded products over time, and thus it is possible to perform melt extrusion such as film molding over a long period of time.

In the case of filtration using a leaf disk type polymer filter as a method of removing contaminants in the film, the resin tends to be thermally degraded due to an increase in residence time during molding. Therefore, longer-term thermal stability is required.

Regarding the heating weight loss (60 min) of the thermoplastic resin composition, the heating weight loss at 60 minutes after heating to 280° C. in an air atmosphere is preferably 10% by mass or less, more preferably 8% by mass or less, and further preferably 6% by mass or less.

The heating weight loss (60 min) is preferably 10% by mass or less because the thermal stability during molding can be more enhanced to keep the thermal decomposition of the resin lower, and to suppress the thermal degradation of the resin due to side reactions. Particularly in the case of filtration using a leaf disk type polymer filter as a method of removing contaminants in the film, unfavorable situations are unlikely to occur such as increase of defects called fish eyes due to thermally degraded products over time, and thus it is possible to perform melt extrusion such as film molding over a long period of time.

The thermoplastic resin composition which can be used in the present invention is preferably an acrylic resin composition with quality requirements such as transparency and weather resistance. An acrylic resin film which is particularly required to have transparency, weather resistance, flexibility, processability, and the like can be used particularly suitably because it contains an easily-burnt rubber-containing polymer (A). A preferred embodiment of the acrylic resin composition includes an embodiment in which either the rubber-containing polymer (A), which is an essential ingredient of the resin composition, or the optionally-contained thermoplastic polymer (D) is an acrylic resin.

The thermoplastic resin composition according to the present invention can contain, for example, additives such as stabilizers, lubricants, processing aids, plasticizers, impact resistance aids, foaming agents, fillers, antibacterial agents, fungicides, mold release agents, antistatic agents, colorants, ultraviolet absorbers, and light stabilizers, if necessary.

When the thermoplastic resin composition according to the present invention is an acrylic resin composition made up of the rubber-containing polymer (A), the phosphorus-based antioxidant (B) having an alkyl group having 8 or more carbon atoms, and an additive, or an acrylic resin composition made up of the rubber-containing polymer (A), the phosphorus-based antioxidant (B) having an alkyl group having 8 or more carbon atoms, an alkyl methacrylate-alkyl acrylate copolymer, and an additive, it is possible to improve the melt flow rate (M1) as an index of fluidity, the MFR retention ratio (M2/M1) as an index of thermal stability, and the heating weight loss (30 min). Note that, within the scope not impairing the spirit of the present invention, the phenolic antioxidant (C) and other thermoplastic polymer (D) can be blended as appropriate.

<Rubber-Containing Polymer (A)>

A polymer containing a vulcanized rubber or a cross-linked rubber having a crosslinking point in the molecule and a three-dimensional network structure in terms of molecular structure is referred to as the "rubber-containing polymer (A)" in the present specification. The "rubber" mentioned herein is defined as a polymer corresponding to an acetone-insoluble matter of the rubber-containing polymer (A) described later.

The thermoplastic resin composition according to the present invention contains the rubber-containing polymer (A). The rubber-containing polymer (A) is not particularly limited, and may be, for example, a known rubber-containing polymer containing rubber described in JIS K6397. However, the rubber-containing polymer (A) is preferably one that imparts thermoplasticity to the thermoplastic resin composition according to the present invention, and is more preferably a rubber-containing polymer having thermoplasticity.

The rubber-containing polymer (A) of the present invention is preferably a rubber-containing acrylic graft copolymer contained in various conventionally known acrylic resin compositions. In particular, when flexibility is required for building materials and the like, rubber-containing acrylic graft copolymers described in Japanese Examined Patent Publication No. Sho 62-19309, Japanese Examined Patent Publication No. Sho 63-8983, and the like are preferable. In particular, in need of scratch resistance, pencil hardness, heat resistance, and chemical resistance that can be used for vehicle applications, rubber-containing acrylic graft copolymers described in Japanese Patent Application Publication No. Hei 8-323934, Japanese Patent Application Publication No. Hei 11-147237, Japanese Patent Application Publication No. 2002-80678, Japanese Patent Application Publication No. 2002-80679, Japanese Patent Application Publication No. 2005-97351, and the like are preferable. Also, particularly in need of molding whitening resistance at insert molding or in-mold molding, rubber-containing acrylic graft copolymers described in Japanese Patent Application Publication No. 2004-137298, Japanese Patent Application Publication No. 2005-163003, Japanese Patent Application Publication No. 2005-139416, Japanese Patent Application Publication No. 2008-106252, and the like are preferable. The rubber-containing acrylic graft copolymer may be used alone or in combination of two or more kinds.

The gel content of the rubber-containing polymer (A) is preferably 40% by mass or more and 99% by mass or less, more preferably 50% by mass or more and 95% by mass or less, and further preferably 55% by mass or more and 90% by mass or less.

When the gel content of the rubber-containing polymer (A) is 40% by mass or more, the resultant molded body can be high in mechanical strength and easier to handle. In particular, when the molded body is a film, it can be easily laminated on the surface of various three-dimensional resin molded products, woodwork products, or metal molded products directly or after laminated on a resin sheet, and is also excellent in design.

Here, the gel content of the rubber-containing polymer (A) can be obtained by calculating the following formula $$G' = (m'/M') \times 100,$$

where G' (%) represents the gel content of the rubber-containing polymer (A), M' represents a predetermined amount (also referred to as pre-extraction mass) of the rubber-containing polymer (A) mass, and m' represents the mass (also referred to as post-extraction mass) of the acetone-insoluble matter of that predetermined amount of the rubber-containing polymer (A).

The gel content of the thermoplastic resin composition is preferably 80% by mass or less. For this reason, when the gel content of the rubber-containing polymer (A) is 80 mass % or more, the thermoplastic polymer (D) can be further contained to adjust the gel content of a thermoplastic resin composition. The ratio of the content of the rubber-containing polymer (A) and the thermoplastic polymer (D) in the thermoplastic resin composition is preferably 100:0 to 40:60 (parts by mass), and more preferably 95:5 to 70:30 (parts by mass).

The gel content of the thermoplastic resin composition is preferably 80% by mass or less because the fluidity and thermal stability during molding can be more enhanced to keep the melt viscosity lower, and the residence in the molding machine can be reduced to suppress the thermal degradation of the resin. When the resultant molded body is a film, unfavorable situations are unlikely to occur such as increase of defects called fish eyes due to thermally degraded products over time, and thus it is possible to perform melt extrusion such as film molding over a long period of time.

<Phosphorus-Based Antioxidant (B) Having Alkyl Group Having 8 or More Carbon Atoms>

The thermoplastic resin composition according to the present invention contains a phosphorus-based antioxidant (B) having an alkyl group having 8 or more carbon atoms. The phosphorus-based antioxidant (B) having an alkyl group having 8 or more carbon atoms is not particularly limited as long as it is a known phosphorus-based antioxidant that is a phosphite compound having an alkyl group having 8 or more carbon atoms. With an alkyl group having 8 or more carbon atoms, it is possible to improve the fluidity of the thermoplastic resin composition.

Examples thereof can include trade names: ADK STAB PEP-8, ADK STAB HP-10, ADK STAB 1178, ADK STAB 1500, ADK STAB C, ADK STAB 135A, and ADK STAB 3010 manufactured by ADEKA CORPORATION, and trade names: JP-351, JP-308E, JP-310, JP-312L, JP-333E, JP-318-O, JPM-308, JPM-311, JPM-313, JPP-613M, JA-805, JPP-88, JPE-10, JPE-13R, JP-318E, and JPP-2000PT manufactured by JOHOKU CHEMICAL CO., LTD. The phosphorus-based antioxidant (B) having an alkyl group having 8 or more carbon atoms may be used alone or in combination of two or more kinds. Moreover, from the viewpoint of the weather resistance of the thermoplastic resin composition, the phosphorus-based antioxidant (B) having an alkyl group having 8 or more carbon atoms preferably has no aromatic ring structure.

The phosphorus-based antioxidant (B) having no aromatic ring structure includes trade names: ADK STAB PEP-8 and ADK STAB 3010 manufactured by ADEKA CORPORATION, and trade names: JP-308E, JP-310, JP-312L, JP-333E, JP-318-O, JPE-10, JPE-13R, JP-318E, and JPP-2000PT manufactured by JOHOKU CHEMICAL CO., LTD.

From the viewpoint of the fluidity and thermal stability of the thermoplastic resin composition, it is possible to suitably use a phosphorus-based antioxidant (B) having alkyl groups each having 8 or more carbon atoms represented by following general formula (1)

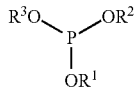

formula (1)

where $R^1$, $R^2$, and $R^3$ each represent an alkyl group having 8 to 18 carbon atoms.

Examples of the phosphorus-based antioxidant (B) having alkyl groups each having 8 or more carbon atoms represented by the general formula (1) can include trade name: ADK STAB 3010 manufactured by ADEKA CORPORATION, and trade names: JP-308E, JP-310, JP-312L, JP-333E, JP-318-O, and JP-318E manufactured by JOHOKU CHEMICAL CO., LTD. The phosphorus-based antioxidants (B) having alkyl groups each having 8 or more carbon atoms represented by the general formula (1) may be used alone or in combination of two or more kinds.

The alkyl groups represented by $R^1$, $R^2$, and $R^3$ preferably have 8 or more carbon atoms because the fluidity of the thermoplastic resin composition can be improved, and the number of carbon atoms is preferably 18 or less because the solubility in the thermoplastic resin composition is good. Moreover, since $R^1$, $R^2$, and $R^3$ are alkyl groups, the influence on light resistance is slight. In view of the fluidity of the thermoplastic resin composition and the effect of suppressing volatilization during molding, an alkyl group having 10 or more carbon atoms is more preferable.

The amount added of the phosphorus-based antioxidant (B) having an alkyl group having 8 or more carbon atoms is preferably used in the range of 0.1 to 5 parts by mass relative to 100 parts by mass of the resin constituting the thermoplastic resin composition (total mass parts of the rubber-containing polymer (A) and the optionally present thermoplastic polymer (D)). From the viewpoint of the melt flow rate (M1) of the thermoplastic resin composition, the amount is more preferably 0.3 parts by mass or more, and further preferably 0.4 parts by mass or more. The amount is preferably 0.1 parts by mass or more because the fluidity during molding can be more enhanced to keep the melt viscosity lower, and the residence in the molding machine can be reduced to suppress the thermal degradation of the resin. When the resultant molded body is a film, unfavorable situations are unlikely to occur such as increase of defects called fish eyes due to thermally degraded products over time, and thus it is possible to perform melt extrusion such as film molding over a long period of time.

Meanwhile, the amount added of the phosphorus-based antioxidant (B) having an alkyl group having 8 or more carbon atoms is more preferably 2 parts by mass or less, and further preferably 1 part by mass or less from the viewpoint of the MFR retention ratio (M2/M1) of the thermoplastic resin composition. The amount is preferably 5 parts by mass or less because the thermal stability during molding can be more enhanced to keep lower the increase in melt viscosity due to the thermal degradation of the resin, and the residence in the molding machine can be reduced to suppress the thermal degradation of the resin. When the resultant molded body is a film, unfavorable situations are unlikely to occur such as increase of defects called fish eyes due to thermally degraded products over time, and thus it is possible to perform melt extrusion such as film molding over a long period of time.

Japanese Patent Application Publication No. 2006-342358 states that, in the case of using a hydroxyl group-containing polymer as a matting agent, it is preferable to contain the phosphorus-based antioxidant (B) having an alkyl group having 8 or more carbon atoms in order to improve matting properties.

However, it is not preferable that the thermoplastic resin composition contains a hydroxyl group-containing polymer and the phosphorus-based antioxidant (B) having an alkyl group having 8 or more carbon atoms, because the fluidity and thermal stability during molding of the thermoplastic resin composition are significantly lowered. More specifically, the phosphorus-based antioxidant (B) having an alkyl group having 8 or more carbon atoms accelerates the crosslinking reaction of the hydroxyl group-containing polymer, which extremely lowers the melt flow rate (M1) and MFR retention ratio (M2/M1) of the thermoplastic resin composition. When the resultant molded body is a film, unfavorable situations are likely to occur such as increase of defects called fish eyes due to thermally degraded products over time, and thus it is difficult to perform melt extrusion such as film molding over a long period of time. Therefore, it is not preferable that the thermoplastic resin composition according to the present invention contains a hydroxyl group-containing polymer.

The hydroxyl group-containing polymer which is not preferably contained in the thermoplastic resin composition according to the present invention can include a polymer obtained by copolymerizing the monomer ingredient composed of a total of 100 mass parts including 1 to 80 parts by mass of hydroxyalkyl (meth)acrylate having an alkyl group having 1 to 8 carbon atoms, 10 to 99 parts by mass of alkyl methacrylate having 1 to 13 carbon atoms, and 0 to 79 parts by mass of alkyl acrylate having an alkyl group having 1 to 8 carbon atoms, or a polymer obtained by copolymerizing the monomer ingredient composed of a total of 100 mass parts including 5 to 80 parts by mass of hydroxyalkyl (meth)acrylate having an alkyl group having 1 to 8 carbon atoms, 10 to 94 parts by mass of alkyl methacrylate having 1 to 13 carbon atoms, and 1 to 80 parts by mass of aromatic vinyl monomer, and the like.

<Phenolic Antioxidant (C)>

The thermoplastic resin composition according to the present invention contains a phenolic antioxidant (C). The phenolic antioxidant (C) is not particularly limited as long as it is a known phenolic antioxidant which is a compound containing a phenolic hydroxyl group.

Examples thereof can include trade names: ADK STAB AO-20, ADK STAB AO-30, ADK STAB AO-40, ADK STAB AO-50, ADK STAB AO-60, ADK STAB AO-80, and ADK STAB AO-330 manufactured by ADEKA CORPORATION, and trade names: Irganox 1010, Irganox 1035, Irganox 1076, Irganox 1098, Irganox 1135, Irganox 1330, Irganox 1425 WL, Irganox 1520 L, Irganox 245, Irganox 259, Irganox 3114, and Irganox 565 manufactured by BASF Japan. The phenolic antioxidant (C) may be used alone or in combination of two or more kinds.

From the viewpoint of long-term thermal stability of the thermoplastic resin composition, ADK STAB AO-60 or Irganox 1010 can be preferably used.

The amount added of the phenolic antioxidant (C) is preferably used in the range of 0.2 to 10 parts by mass relative to 100 parts by mass of the resin constituting the thermoplastic resin composition (total mass parts of the rubber-containing polymer (A) and the optionally present thermoplastic polymer (D)). The amount is more preferably 0.5 parts by mass or more, and further preferably 0.8 parts by mass or more from the viewpoints of thermal stability and weather resistance during molding. Meanwhile, the amount is more preferably 5 parts by mass or less, and further preferably 3 parts by mass or less from the viewpoint of preventing process contamination during film formation and the viewpoint of the transparency of the molded body.

<Thermoplastic Polymer (D)>

A polymer having thermoplasticity but no crosslinking point in the molecule in terms of molecular structure is referred to as the "thermoplastic polymer (D)" in the present specification.

The thermoplastic resin composition according to the present invention may contain the thermoplastic polymer (D). The thermoplastic polymer (D) is not particularly limited as long as it is a known thermoplastic polymer.

Examples thereof can include polyethylene-based resins, polypropylene-based resins, vinyl chloride-based resins, polystyrene-based resins, AS-based resins, PET-based resins, acrylic resins, vinyl alcohol-based resins, EVA-based resins, vinylidene chloride-based resins, polycarbonate-based resins, polyamide-based resins, polyacetal-based resins, PBT-based resins, fluorine-based resins, and thermoplastic elastomers. The thermoplastic polymer (D) may be used alone or in combination of two or more kinds.

The thermoplastic polymer (D) which can be used in the present invention is preferably an acrylic polymer with quality requirements such as transparency and weather resistance. An acrylic resin film which is particularly required to have transparency, weather resistance, flexibility, processability, and the like can be used particularly suitably because it contains an easily-burnt rubber-containing polymer (A).

<Acrylic Polymer>

In the following description, "(meth)acrylic" means acrylic and/or methacrylic. "Alkyl (meth)acrylate" means alkyl acrylate and/or alkyl methacrylate. In addition, "alkyl acrylate" and "alkyl methacrylate" mean an alkyl ester of acrylic acid and an alkyl ester of methacrylic acid, respectively.

The acrylic polymer which can be used as the thermoplastic polymer (D) in the present invention is not particularly limited except that the main ingredient is an alkyl (meth)acrylate.

The acrylic polymer includes an acrylic polymer which contains 50 to 100% by mass of an alkyl (meth)acrylate unit having an alkyl group having 1 to 4 carbon atoms and 0 to 50% by mass of at least one type of monomer unit of another vinyl monomer copolymerizable therewith, and whose polymer reduced viscosity is 0.1 L/g or less. Note that the reduced viscosity is measured at 25° C. after dissolving 0.1 g of the polymer in 100 ml of chloroform. The content of the alkyl (meth)acrylate unit is preferably 70 to 100% by mass. Additionally, the acrylic polymer preferably has a glass transition temperature of 80 to 110° C.

The acrylic polymer is preferably an alkyl methacrylate-alkyl acrylate copolymer. Specific examples of such an acrylic polymer include, for example, trade names: ACRYPET VH, ACRYPET MD, and ACRYPET MF manufactured by Mitsubishi Chemical Corporation.

<Thermoplastic Resin Molded Body>

The thermoplastic resin molded body obtained in the present invention includes pellets, films, laminated films, and sheets, but are is particularly limited as long as it is a known thermoplastic resin molded body.

<Additive>

The thermoplastic resin composition according to the present invention can contain, for example, additives such as stabilizers, lubricants, processing aids, plasticizers, impact resistance aids, foaming agents, fillers, antibacterial agents, fungicides, mold release agents, antistatic agents, colorants, ultraviolet absorbers, light stabilizers, and phosphorus-based antioxidants, if necessary.

Particularly when the thermoplastic resin molded body is an acrylic resin film and is used as a protective layer for a base material, the thermoplastic resin composition preferably contains an ultraviolet absorber and/or a light stabilizer in order to impart weather resistance.

As an ultraviolet absorber, a known one can be used and a copolymerization type one can also be used. The molecular weight of the ultraviolet absorber used is preferably 300 or more and more preferably 400 or more. In the case of using an ultraviolet absorber having a molecular weight of 300 or more, it is possible to prevent mold contamination due to volatilization of the ultraviolet absorber when vacuum molding or pressure molding is performed in an injection mold. In addition, in general, an ultraviolet absorber having a higher molecular weight is less prone to long-term bleed-out after being processed into a film state, and its ultraviolet absorption performance lasts longer than that having a lower molecular weight.

Moreover, when the ultraviolet absorber has a molecular weight of 300 or more, the amount is small of the ultraviolet absorber which volatilizes during the time interval after the acrylic resin film is extruded from the T-die and before cooled by the cooling roll. Therefore, since the amount of the remaining ultraviolet absorber is sufficient, good performance is exhibited. In addition, the problem is less frequently encountered that the volatilized ultraviolet absorber recrystallizes on the exhaust hood and the chain for suspending the T-die at the top of the T-die and grows over time, which eventually falls on the film to cause appearance defects.

Although the type of ultraviolet absorber is not particularly limited, it is possible to preferably use a benzotriazole-based one having a molecular weight of 400 or more or a triazine-based one having a molecular weight of 400 or more. Specific examples of the former include trade names: ADK STAB LA-24 and ADK STAB LA-31RG manufactured by ADEKA CORPORATION, and Tinuvin 234 and Tinuvin 360 manufactured by BASF Japan, and specific examples of the latter include trade names: ADK STAB LA-46 and ADK STAB LA-F70 manufactured by ADEKA CORPORATION, and trade names: Tinuvin 1577ED and Tinuvin 1600 manufactured by BASF Japan.

From the viewpoint of long-term thermal stability of the ultraviolet absorber itself, ADK STAB LA-31RG can be preferably used.

The amount added of the ultraviolet absorber is preferably used in the range of 0.1 to 10 parts by mass relative to 100 parts by mass of the resin constituting the thermoplastic resin composition. The amount is more preferably 0.5 parts by mass or more, and further preferably 1 part by mass or more from the viewpoint of improving weather resistance. Meanwhile, the amount is more preferably 5 parts by mass or less, and further preferably 3 parts by mass or less from the viewpoint of preventing process contamination during film formation and the viewpoint of the transparency of the molded body.

As a light stabilizer, a known one can be used and a radical scavenger such as a hindered amine-based light stabilizer is particularly preferable.

Examples thereof can include trade names: ADK STAB LA-52, ADK STAB LA-57, ADK STAB LA-57G ADK STAB LA-63P, ADK STAB LA-68, ADK STAB LA-72, ADK STAB LA-77Y, ADK STAB LA-81, and ADK STAB LA-94G manufactured by ADEKA CORPORATION, and trade names: Chimassorb 2020 FDL and Chimassorb 944 FDL manufactured by BASF Japan.

From the viewpoint of long-term thermal stability of the thermoplastic resin composition, Chimassorb 2020 FDL can be suitably used.

The amount added of the light stabilizer is preferably used in the range of 0.1 to 2 parts by mass relative to 100 parts by mass of the resin constituting the thermoplastic resin composition. The amount is more preferably 0.2 parts by mass or more from the viewpoint of the weather resistance of the thermoplastic resin composition. Meanwhile, the amount is more preferably 1 part by mass or less, and further preferably 0.5 parts by mass or less from the viewpoint of the MFR retention ratio (M2/M1) of the thermoplastic resin composition. The amount is preferably 2 parts by mass or less because the thermal stability during molding can be more enhanced to keep lower the increase in melt viscosity due to the thermal degradation of the resin, and the residence in the molding machine can be reduced to suppress the thermal degradation of the resin. When the resultant molded body is a film, unfavorable situations are unlikely to occur such as increase of defects called fish eyes due to thermally degraded products over time, and thus it is possible to perform melt extrusion such as film molding over a long period of time.

<Pellet>

When the thermoplastic resin molded body obtained by the present invention is a pellet, it can be produced by using an extruder through a known method such as a uniaxial kneading method, a co-directional biaxial kneading method, or a counter-directional biaxial kneading method, but a method having a large kneading effect such as a biaxial kneading method is preferable.

A preferable twin screw extruder includes the TEM series manufactured by Toshiba Machine Co., Ltd. In addition, the screw configuration includes a screw configuration which has a transport unit for transporting a thermoplastic resin composition and a kneading unit for kneading a thermoplastic resin composition such as a kneading zone or a screw segment having a reverse feeding direction of a melt (a screw segment having a reverse spiral winding direction).

In addition, the extruder preferably has a vent which can degas the moisture in the thermoplastic resin composition as a raw material and volatile gas generated from the melt-kneaded melt. A pressure reducing pump such as a vacuum pump is preferably installed in the vent. By such installation, the generated moisture and volatile gas are efficiently discharged outside the extruder. Additionally, a foreign matter can also be removed from the thermoplastic resin composition by installing a screen for removing foreign matter and the like mixed in the extrusion raw material in the zone in front of the die portion of the extruder. As such a screen, filter packs, screen changers, and leaf disk type and pleated type polymer filters using wire mesh or sintered metal nonwoven fabric are exemplified.

Further, as a method of increasing the kneading effect, it is also possible to increase the rotational speed of the screw as much as possible and reduce the amount of the thermoplastic resin composition supplied. The thermoplastic resin composition thus melt-extruded tends to generate shear heat and tends to increase in temperature at the head portion. The melt which has been melt-kneaded in the extruder is extruded as a strand from a die with a nozzle having a diameter of about 3 to 5 mm installed on the head portion, and is cut into pellets by a cold cut method, a hot cut method, or the like.

<Film>

When the thermoplastic resin molded body obtained by the present invention is a film, it can be produced by a known method such as a melt casting method, a T-die method, or an inflation method, but the T-die method is preferable from the viewpoint of economy.

When a film is formed by the T-die method, use of a method of forming a film by sandwiching it between a plurality of rolls or belts selected from metal rolls, non-metal rolls, and metal belts makes it possible to improve the surface smoothness of the resulting film, and to suppress printing omission when printing on the film. In addition, as a metal roll, it is possible to exemplify the metal mirror surface touch roll described in Japanese Patent No. 2808251 or the roll used in sleeve touch mode which is composed of a metal sleeve (metal thin film pipe) and a molding roll, described in International Publication No. WO 97/28950. In addition, as a non-metal roll, it is possible to exemplify touch rolls made of silicon rubber and the like. Moreover, as a metal belt, it is possible to exemplify a metal endless belt. Note that two or more of these metal rolls, non-metal rolls, and metal belts can be used in combination.

In the above-described method of forming a film by sandwiching it between a plurality of rolls or belts selected from metal rolls, non-metal rolls, and metal belts, it is preferable to sandwich the thermoplastic resin composition after melt extrusion in a state where there is substantially no bank (resin pool), and to transfer the surface without substantial rolling, thereby forming a film. When a film is formed without forming a bank (resin pool), the thermoplastic resin composition in the cooling process is surface-transferred without being rolled, and thus it is also possible to reduce the heat shrinkage rate of the film formed by this method.

Note that, in the case of melt extrusion by the T-die method or the like, a foreign matter can also be removed from the thermoplastic resin composition by installing a screen for removing foreign matter and the like mixed in the extrusion raw material in the zone in front of the T-die portion of the extruder. As such a screen, filter packs, screen changers, and leaf disk type and pleated type polymer filters using wire mesh or sintered metal nonwoven fabric are exemplified.

<Acrylic Resin Film>

When the thermoplastic resin molded body obtained by the present invention is an acrylic resin film, the thickness of the acrylic resin film is preferably 300 µm or less. When used in a laminate molded product, the thickness is preferably 50 to 300 µm. This thickness is preferably 50 µm or more, because a sufficient depth can be obtained in the appearance of the molded product. Particularly when molding into a complicated shape, a sufficient thickness can be obtained by stretching. Meanwhile, the thickness is preferably 300 µm or less, because an appropriate rigidity is achieved, which tends to improve the laminating property, the secondary processability, and the like. In addition, economical advantage is achieved in terms of mass per unit area. Furthermore, the film forming property is stable and the production of the film is facilitated. Besides, the T-die multilayer method or the like makes it possible to form an acrylic resin laminated film in which another resin is further laminated on the acrylic resin film.

If necessary, the acrylic resin film can be subjected to surface treatment for imparting various functions. The surface treatment includes printing treatment such as silk printing and inkjet printing, metal deposition for imparting metallic tone or antireflection, sputtering, wet plating treatment, surface hardening treatment for improving the surface hardness, water repellency treatment for preventing contamination or photocatalyst layer formation treatment, antistatic treatment for the purpose of preventing dust adhesion or cutting electromagnetic waves, antireflection layer formation, antiglare treatment, and the like.

Among the treatments described above, it is preferable to carry out one-sided printing treatment on the film in the case of performing printing treatment. Further, from the viewpoint of protecting the printing surface and imparting a high-class impression, back surface printing is particularly preferable in which the printing surface is arranged on the adhesive surface with the base resin.

<Acrylic Resin Laminated Film>

The thermoplastic resin molded body obtained by laminating another resin composition on the surface of the acrylic resin film of the present invention is referred to as the "acrylic resin laminated film" in the present specification.

For example, when surface hardness is required, a resin composition having high surface hardness may be laminated. Specifically, it is preferable to use an acrylic resin composition having a scratch hardness of 2H or more based on JIS K5600-5-4 (pencil method), because it is possible to obtain an acrylic resin laminated film having molding whitening resistance, surface hardness (scratch resistance), and heat resistance.

In addition, when weather resistance and solvent resistance are required, a fluorine-based resin composition may be laminated. The type of the fluorine-based resin composition is not particularly limited, and a known fluorine-based resin composition can be used. Specific examples include vinylidene fluoride polymers, fluorine compounds such as vinylidene fluoride, vinyl fluoride, and tetrafluoroethylene, copolymers of vinylidene fluoride and acrylic monomers such as alkyl acrylate and alkyl methacrylate, and resin compositions having a vinylidene fluoride polymer as a main ingredient.

When low gloss is required, a matte resin composition may be laminated. Specific Examples include matte resin compositions obtained by a method of blending inorganic fillers or crosslinkable polymer particles, a method of copolymerizing epoxy group-containing monomers, and a method using a linear polymer having a hydroxyl group.

In the case of using a hydroxyl group-containing polymer as a matting agent, it is preferable to contain the phosphorus-based antioxidant (B) having an alkyl group having 8 or more carbon atoms in order to improve matting properties. It is preferable that the thermoplastic resin composition contains a hydroxyl group-containing polymer and the phosphorus-based antioxidant (B) having an alkyl group having 8 or more carbon atoms, because the fluidity and thermal stability during molding of the thermoplastic resin composition are significantly lowered, but lamination as a matte resin layer makes it possible to obtain an acrylic resin laminated film having high fluidity and thermal stability during molding.

<Acrylic Resin Film Laminated Body>

The thermoplastic resin molded body obtained by laminating the acrylic resin film of the present invention on a base material is referred to as the "acrylic resin film laminated body" in the present specification.

For example, when an acrylic resin film is used while being transparent and laminated on a base material, it can be used as an alternative to clear painting, making it possible to make use of the color tone of the base material. Thus, in applications which make use of the color tone of the base material, acrylic resin films are superior in terms of transparency, depth, and high-class impression compared to polyvinyl chloride films and polyester films.

The base material on which the acrylic resin film is laminated includes various resin molded products, woodwork products, and metal molded products. In addition, among the resin molded products, the resin constituting a thermoplastic resin molded product capable of melt bond to acrylic resin films include ABS resins, AS resins, polystyrene resins, polycarbonate resins, vinyl chloride resins, acrylic resins, polyester-based resins, and resins containing these as a main ingredient. Among these, ABS resins, AS resins, polycarbonate resins, vinyl chloride resins, or resins mainly composed of these resins are preferable in terms of adhesiveness. Note that, even in the case of a base resin that is difficult to be melt-bonded such as a polyolefin resin, it is possible to bond the acrylic resin film and the base material by using an adhesive layer.

When an acrylic resin film is laminated on a thin-thickness base material having a substantially two-dimensional shape, it can be bonded to a base material capable of heat sealing by a known method such as thermal lamination. Moreover, in the case of a base material incapable of heat sealing, bonding is possible by using an adhesive agent or adhesive-processing one side of the acrylic resin film.

In addition, when an acrylic resin film is laminated on a base material having a three-dimensional shape, bonding is possible by a known molding method such as an insert molding method including inserting an acrylic resin film shape-processed in advance into an injection mold and an in-mold molding method including performing vacuum molding in a mold and then injection molding. Among these, the in-mold molding method is preferable. The in-mold molding method molds an acrylic resin film into a three-dimensional shape by vacuum molding, and then pours a base resin into the molded product by injection molding to produce a single unit. Therefore, it is possible to easily obtain an acrylic laminate molded product having an acrylic resin film on the surface layer. In addition, this method is excellent in workability and economy because the film can be molded and injection molded in one step.

The heating temperature in the in-mold molding method is equal to or higher than the temperature at which the acrylic resin film is softened, and is usually preferably 70 to 170° C. When the heating temperature is less than 70° C., molding may be difficult, and when the heating temperature exceeds 170° C., the surface appearance is deteriorated or the mold releasability is deteriorated.

Such an acrylic resin molded body is excellent in appearance, weather resistance, transparency, printability, water whitening resistance, and the like, and therefore is very useful as a protective film for members for water areas such as kitchen and bathroom and outdoor building material parts such as siding materials, and has high industrial value. In addition, the acrylic resin molded body can be used for purposes other than a protective film for members for water areas such as kitchen and bathroom and exterior building material parts such as outer wall materials and siding materials. In particular, acrylic resin films having a good appearance can be used for a polarizing film protective film used for a polarizing plate of a liquid crystal display or a retardation film used for a retardation plate for viewing angle compensation and retardation compensation, for example.

Moreover, industrial utilization fields of acrylic resin film laminated bodies include, for example, high-intensity reflective materials used for road signs, display boards, and safety devices for the purpose of visibility. Examples of the high-intensity reflective materials include capsule-type reflective materials in which glass beads subjected to aluminum deposition are embedded in a base material, prism-type reflective materials using a prism-processed resin sheet as a reflector, and the like. In any type, the above-mentioned acrylic resin films can be suitably used as a protective film used by being laminated on the surface of a reflective material. Specifically, the above-mentioned high-intensity reflective materials having an acrylic resin film on their surface have extremely high industrial utility value as a protective film for high-intensity reflective materials because there is a small degree of decrease in the visibility of the high-intensity reflective materials due to rainwater whitening or the like.

EXAMPLES

Hereinafter, the present invention is further described with reference to Examples and Comparative Examples. Note that, in the following description, "part" means "part by mass" and "%" means "% by mass," and abbreviations mean the compound names presented in Table 1. First, an evaluation method and a preparation example of the rubber-containing polymer (A) are described.

<Evaluation Method>
(Gel Content of Rubber-Containing Polymer (A))

An acetone solution, obtained by dissolving 0.5 g of the rubber-containing polymer (A) as a pre-extraction mass M' in 50 mL of acetone, was refluxed at 65° C. for 4 hours. The resultant extract was centrifuged at 14000 rpm for 30 minutes at 4° C. using a high-speed cooling centrifuge (manufactured by Hitachi Koki Co., Ltd. under the trade name: CR21G). The solution was removed by decantation to obtain a remaining solid. The solid was subjected to reflux, centrifugation, the resultant solid was dried at 50° C. for 24 hours, and the mass of the acetone-insoluble matter obtained was measured as the post-extraction mass m'. The gel content G' (%) of the rubber-containing polymer (A) was calculated from the pre-extraction mass M' and the post-extraction mass m' by the following formula.

$$G'=(m'/M')\times 100,$$

where G' (%) represents the gel content of the rubber-containing polymer (A), M' represents a predetermined amount (also referred to as pre-extraction mass) of the rubber-containing polymer (A) mass, and m' represents the mass (also referred to as post-extraction mass) of the acetone-insoluble matter of that predetermined amount of the rubber-containing polymer (A).

(Gel Content of Thermoplastic Resin Composition)

An acetone solution, obtained by dissolving 0.5 g of an acrylic resin composition as a pre-extraction mass M in 50 mL of acetone, was refluxed at 65° C. for 4 hours. The resultant extract was centrifuged at 14000 rpm for 30 minutes at 4° C. using a high-speed cooling centrifuge (manufactured by Hitachi Koki Co., Ltd. under the trade name: CR21G). The solution was removed by decantation to obtain a remaining solid. The solid was subjected to reflux, centrifugation, the resultant solid was dried at 50° C. for 24 hours, and the mass of the acetone-insoluble matter obtained was measured as the post-extraction mass m. The gel content G (%) of the thermoplastic resin composition was calculated from the pre-extraction mass M and the post-extraction mass m by the following formula.

$$G=(m/M)\times 100,$$

where G (%) represents the gel content of the thermoplastic resin composition, M represents a predetermined amount (also referred to as pre-extraction mass) of the thermoplastic resin composition, and m represents the mass (also referred to as post-extraction mass) of the acetone-insoluble matter of that predetermined amount of the thermoplastic resin composition.

(Melt Flow Rate (M1))

A melt indexer (manufactured by Toyo Seiki Seisaku-sho, Ltd. under the trade name: S-111) was used to measure the melt flow rate (M1) for a retention time of 4 minutes for a sample amount of 4 g in accordance with JIS K7210 (Method A) under conditions of a temperature of 280° C. and a load of 49 N. The sample cut time interval was set to 5 to 120 seconds according to the melt flow rate (M1) of the sample, thereby measuring the discharge rate per unit time to calculate the melt flow rate (M1) in g/10 min.

(MFR Retention Ratio (M2/M1))

A melt indexer (manufactured by Toyo Seiki Seisaku-sho, Ltd. under the trade name: S-111) was used to measure the melt flow rate (M2) for a retention time of 30 minutes for a sample amount of 4 g in accordance with JIS K7210 (Method A) under conditions of a temperature of 280° C. and a load of 49 N. The sample cut time interval was set to 5 to 120 seconds according to the melt flow rate (M2) of the sample, thereby measuring the discharge rate per unit time to calculate the melt flow rate (M2) in g/10 min. The MFR retention ratio (M2/M1) was calculated by the ratio of the melt flow rate (M2) for a retention time of 30 minutes to the melt flow rate (M1) for a retention time of 4 minutes.

(MFR Retention Ratio (M3/M1))

A melt indexer (manufactured by Toyo Seiki Seisaku-sho, Ltd. under the trade name: S-111) was used to measure the melt flow rate (M3) for a retention time of 60 minutes for a sample amount of 4 g in accordance with JIS K7210 (Method A) under conditions of a temperature of 280° C. and a load of 49 N. The sample cut time interval was set to 5 to 120 seconds according to the melt flow rate (M3) of the sample, thereby measuring the discharge rate per unit time to calculate the melt flow rate (M3) in g/10 min. The MFR retention ratio (M3/M1) was calculated by the ratio of the melt flow rate (M3) for a retention time of 60 minutes to the melt flow rate (M1) for a retention time of 4 minutes.

(Heating Weight Loss (30 Min))

Using a simultaneous thermogravimetric/differential thermal analyzer (SII Nanotechnology, Inc., trade name: TG/DTA6200), the temperature was raised at a rate of 50° C./min to 230° C. and 3° C./min to 275° C. in an air atmosphere to carry out measurement at 280° C. for 120 minutes. The heating weight loss (% by mass) at 30 minutes from reaching 280° C. was calculated. The average temperature during the measurement was 281° C.

(Heating Weight Loss (60 Min))

Using a simultaneous thermogravimetric/differential thermal analyzer (SII Nanotechnology, Inc., trade name: TG/DTA6200), the temperature was raised at a rate of 50° C./min to 230° C. and 3° C./min to 275° C. in an air atmosphere to carry out measurement at 280° C. for 120 minutes. The heating weight loss (% by mass) at 60 minutes from reaching 280° C. was calculated. The average temperature during the measurement was 281° C.

<Preparation Example 1> Production of Rubber-Containing Multistage Polymer (I)

In a vessel equipped with a stirrer, 10.8 parts of deionized water was charged, and then a monomer ingredient (i-a-1) composed of 0.3 parts of MMA, 4.5 parts of nBA, 0.2 parts of BDMA, 0.05 parts of AMA, and 0.025 parts of CHP was added, followed by stirring and mixing at room temperature. Next, with stirring, 1.3 parts of emulsifier S was charged into the above vessel, and stirring was continued for 20 minutes to prepare an "emulsion 1."

Next, 156.0 parts of deionized water was put into a polymerization vessel equipped with a reflux condenser, and the temperature was raised to 74° C. Moreover, a mixture was prepared by adding 0.20 parts of sodium formaldehyde sulfoxylate, 0.0001 parts of ferrous sulfate, and 0.0003 parts of EDTA to 4.5 parts of deionized water, and this mixture was put into the polymerization vessel. Next, the emulsion 1 was added dropwise to the polymerization vessel over 9 minutes with stirring in a nitrogen atmosphere, and then the reaction was allowed to continue for 15 minutes to complete the polymerization of a polymer (I-a1).

Subsequently, a monomer ingredient (i-a-2) composed of 9.6 parts of MMA, 14.4 parts of nBA, 1 part of BDMA, 0.25 parts of AMA, and 0.016 parts of CHP was added dropwise to the polymerization vessel over 90 minutes, and then the reaction was allowed to continue for 60 minutes to produce a polymer (I-a2). As described above, a polymer (I-A) containing the polymer (I-a1) and the polymer (I-a2) was obtained. Note that, when the monomer ingredients for the polymer (I-a1) and the polymer (I-a2) were separately polymerized under the same conditions as described above, the Tg of the polymer (I-a1) was −48° C., and the Tg of the polymer (I-a2) was −10° C.

Subsequently, a monomer ingredient (i-c) composed of 6 parts of MMA, 4 parts of MA, 0.075 parts of AMA, and 0.013 parts of CHP was added dropwise to the polymerization vessel over 45 minutes, and then the reaction was allowed to continue for 60 minutes to form a polymer (I-C). Note that, when the monomer ingredients for the polymer (I-C) were separately polymerized under the same conditions as described above, the Tg of the polymer (I-C) was 60° C.

Subsequently, a monomer ingredient (i-b) composed of 57 parts of MMA, 3 parts of MA, 0.075 parts of tBHP, and 0.248 parts of nOM was added dropwise to the polymerization vessel over 140 minutes, and then the reaction was allowed to continue for 60 minutes to form a polymer (I-B), thereby obtaining a polymer latex of a rubber-containing multistage polymer (I).

The obtained polymer latex of the rubber-containing multistage polymer (I) was filtered using a vibration type filtration device with an SUS mesh (average opening: 54 m) attached to the filter medium, and thereafter was salted out in an aqueous solution containing 3.5 parts of calcium acetate, washed with water, recovered, and then dried to obtain a powdery rubber-containing multistage polymer (I). Table 2 presents a list of monomer ingredients. Note that the gel content of the rubber-containing multistage polymer (I) was 70%.

<Preparation Example 2> Production of Rubber-Containing Multistage Polymer (II)

Deionized water at 186.3 parts was put into a polymerization vessel equipped with a reflux condenser, and the temperature was raised to 79° C. Moreover, a mixture was prepared by adding 0.25 parts of sodium formaldehyde sulfoxylate, 0.000025 parts of ferrous sulfate, and 0.000075 parts of EDTA to 3.4 parts of deionized water, and this mixture was put into the polymerization vessel.

Next, a 1/10 charge of a mixture of 0.75 parts of the emulsifier S and a monomer ingredient (ii-a-1) composed of 11.25 parts of MMA, 12.5 parts of nBA, 1.25 parts of St, 0.74 parts of BDMA, 0.09 parts of AMA, and 0.044 parts of tBHP was added dropwise to the polymerization vessel over 4 minutes with stirring in a nitrogen atmosphere. Thereafter, the reaction was allowed to continue for 15 minutes, after which the remaining 9/10 charge of the mixture was added dropwise to the polymerization vessel over 108 minutes. After that, 0.125 parts of sodium formaldehyde sulfoxylate was added when the reaction time had elapsed 40 minutes, and the reaction was allowed to continue for 55 minutes to complete the polymerization of the polymer (II-a1).

Subsequently, a monomer ingredient (ii-a-2) composed of 30.94 parts of nBA, 6.56 parts of St, 0.10 parts of BDMA, 0.65 parts of AMA, and 0.106 parts of CHP was added dropwise to the polymerization vessel over 180 minutes. After that, 0.125 parts of sodium formaldehyde sulfoxylate was added when the reaction time had elapsed 105 minutes, and the reaction was allowed to continue for 120 minutes to produce a polymer (II-a2). As described above, a polymer (II-A) containing the polymer (II-a1) and the polymer (II-a2) was obtained.

Subsequently, a monomer ingredient (ii-b) composed of 35.63 parts of MMA, 1.88 parts of MA, 0.064 parts of tBHP, and 0.103 parts of nOM was added dropwise to the polymerization vessel over 120 minutes to form a polymer (II-B), thereby obtaining a polymer latex of a rubber-containing multistage polymer (II).

The obtained polymer latex of the rubber-containing multistage polymer (II) was filtered using a vibration type filtration device with an SUS mesh (average opening: 54 m) attached to the filter medium, and thereafter was salted out in an aqueous solution containing 5.0 parts of calcium acetate, washed with water, recovered, and then dried to obtain a powdery rubber-containing multistage polymer (II). Table 2 presents a list of monomer ingredients. Note that the gel content of the rubber-containing multistage polymer (II) was 90%.

<Preparation Example 3> Production of Hydroxyl Group-Containing Polymer (I)

In a polymerization vessel equipped with a reflux condenser, a monomer mixture composed of 262 parts of deionized water, 12.3 parts of 10% tribasic calcium phosphate slurry, 60.0 parts of MMA, 10.0 parts of MA, 30.0 parts of 2-hydroxyethyl methacrylate, 0.25 parts of n-dodecyl mercaptan, and 0.52 parts of lauroyl peroxide was charged, and the atmosphere in the polymerization vessel was sufficiently replaced with nitrogen gas. Next, the temperature was raised to 78° C. while stirring the monomer mixture, followed by reaction for 2 hours in a nitrogen atmosphere. Subsequently, the temperature of the liquid in the polymerization vessel was raised to 85° C., and then 0.022 parts of potassium persulfate was added, followed by further retention for 90 minutes to obtain polymer beads. The obtained polymer beads were sieved under the condition of 150 mesh (opening 100 μm), and the beads passed through the mesh were dehydrated and dried to obtain beads of the hydroxyl group-containing polymer (I).

Example 1

As the thermoplastic resin compositions presented in Table 3-1, 80 parts of the rubber-containing multistage polymer (I) obtained in Preparation Example 1 being the rubber-containing polymer (A), 10 parts of the rubber-containing multistage polymer (II) obtained in Preparation Example 2, 10 parts of ACRYPET VH manufactured by Mitsubishi Chemical Corporation being the thermoplastic polymer (D), and 0.5 parts of JP-333E manufactured by JOHOKU CHEMICAL CO., LTD being the phosphorus-based antioxidant (B) having an alkyl group having 8 or more carbon atoms as well as 1.1 parts of ADK STAB LA-31RG manufactured by ADEKA CORPORATION as an additive were added and then mixed using a Henschel mixer. Using a twin screw extruder (manufactured by Toshiba Machine Co., Ltd under the trade name: TEM-35B), the mixture was extruded into a strand shape while removing contaminants with a breaker mesh (manufactured by Nippon Seisen Co., Ltd. under the trade name: NF-12T, nominal filtration diameter 40 μm) under the conditions of a cylinder temperature of 180 to 240° C. and a die head temperature of 240° C., cooled by being passed through a water bath, and cut into pellets. The resin temperature at the die outlet was 270° C. for a screw rotational speed of 150 rpm and a discharge rate of 8.6 kg/h. Table 3-1 presents the evaluation results of the obtained pellets.

Examples 2 to 9 and Comparative Examples 1 to 5

The same procedures as in Example 1 were carried out except that the thermoplastic resin compositions presented in Tables 3-1 to 3-3 were used. The evaluation results of the obtained pellets are presented in Tables 3-1 to 3-3.

The pellets obtained in Examples 5 and 8 were dehumidified and dried whole day at 85° C. to form an acrylic resin film having a thickness of 75 μm by using a 40 mmφ non-vent screw type extruder (L/D=26) equipped with a 300 mm wide T-die under the conditions of a cylinder temperature of 220 to 240° C. and a T-die temperature of 245° C. The 60° glossiness of the obtained transparent acrylic resin film was 140%.

TABLE 1

| Abbreviation | Compound Name |
| --- | --- |
| MMA | Methyl Methacrylate |
| nBA | n-Butyl Acrylate |
| St | Styrene |
| MA | Methyl Acrylate |
| AMA | Allyl Methacrylate |
| BDMA | 1,3-Butyleneglycol Dimethacrylate |
| tBHP | t-Butyl Hydroperoxide |
| CHP | Cumene Hydroperoxide |
| nOM | n-Octyl Mercaptan |
| Emulsifier S | Sodium Polyoxyethylene Alkyl Ether Phosphate "Manufactured by TOHO Chemical Industry Co., Ltd. under the trade name: Phosphanol RS-610NA" |
| EDTA | Ethylenediaminetetraacetic acid disodium salt |

TABLE 2

| | Rubber-Containing Multistage Polymer (I) | | | Rubber-Containing Multistage Polymer (II) | |
| --- | --- | --- | --- | --- | --- |
| Monomer Ingredient | Type | Parts by Mass | Monomer Ingredient | Type | Parts by Mass |
| Monomer Ingredient (i-a-1) | MMA | 0.3 | Monomer Ingredient (ii-a-1) | MMA | 11.25 |
| | nBA | 4.5 | | nBA | 12.5 |
| | — | — | | St | 1.25 |
| | BDMA | 0.2 | | BDMA | 0.74 |
| | AMA | 0.05 | | AMA | 0.09 |
| | CHP | 0.025 | | tBHP | 0.044 |
| Monomer Ingredient (i-a-2) | MMA | 9.6 | Monomer Ingredient (ii-a-2) | nBA | 30.94 |
| | nBA | 14.4 | | St | 6.56 |
| | BDMA | 1 | | BDMA | 0.10 |
| | AMA | 0.25 | | AMA | 0.65 |
| | CHP | 0.016 | | CHP | 0.106 |
| Monomer Ingredient (i-c) | MMA | 6 | — | — | — |
| | MA | 4 | | — | — |
| | AMA | 0.075 | | — | — |
| | CHP | 0.013 | | — | — |
| Monomer Ingredient (i-b) | MMA | 57 | Monomer Ingredient (ii-b) | MMA | 35.63 |
| | MA | 3 | | MA | 1.88 |
| | tBHP | 0.075 | | tBHP | 0.064 |
| | nOM | 0.248 | | nOM | 0.103 |

TABLE 3-1

| | | | Example 1 | Example 2 | Example 3 | Example 4 | Example 5 |
| --- | --- | --- | --- | --- | --- | --- | --- |
| Thermoplastic Resin | Rubber-Containing Polymer (A) | Rubber-Containing Multistage Polymer (I) | 80 | 80 | 80 | 80 | 80 |

TABLE 3-1-continued

|  |  |  | Example 1 | Example 2 | Example 3 | Example 4 | Example 5 |
|---|---|---|---|---|---|---|---|
| Composition (Parts By Mass) |  | Rubber-Containing Multistage Polymer (II) | 10 | 10 | 10 | 10 | 10 |
|  | Phosphorus-Based Antioxidant (B) Having Alkyl Group Having 8 or More Carbon Atoms | JP-333E | 0.5 | 0.5 | 0.5 | 0.5 | 0.5 |
|  |  | ADK STAB PEP-8 | — | — | — | — | — |
|  | Phenolic Antioxidant (C) | ADK STAB AO-60 | — | 0.5 | 1.0 | 0.5 | 0.5 |
|  |  | ADK STAB AO-40 | — | — | — | — | — |
|  | Thermoplastic Polymer (D) | ACRYPET VH | 10 | 10 | 10 | 10 | 10 |
|  |  | ACRYPET MD | — | — | — | — | — |
|  | Additive  Phosphorus-Based Antioxidant | ADK STAB PEP-36 | — | — | — | — | — |
|  |  | Irgafos 168 | — | — | — | — | — |
|  | Ultraviolet Absorber | ADK STAB LA-31RG | 1.1 | 1.1 | 1.1 | 1.1 | 1.1 |
|  | Light Stabilizer | Chimassorb 2020 FDL | — | — | — | 0.5 | 1.0 |
| Physical Property | Gel Content [%] |  | 63 | 63 | 62 | 62 | 62 |
|  | Melt Flow Rate (M1) [g/10 min] |  | 25 | 27 | 28 | 27 | 26 |
|  | MFR Retention Ratio (M2/M1) [—] |  | 1.1 | 1.1 | 1.1 | 1.1 | 1.0 |
|  | MFR Retention Ratio (M3/M1) [—] |  | 1.2 | 1.0 | 1.3 | 0.8 | 0.6 |
|  | Heating Weight Loss (30 min) [%] |  | 56 | 4 | 3 | 3 | 3 |
|  | Heating Weight Loss (60 min) [%] |  | 63 | 42 | 8 | 6 | 7 |

TABLE 3-2

|  |  |  | Example 6 | Example 7 | Example 8 | Example 9 |
|---|---|---|---|---|---|---|
| Thermoplastic Resin Composition (Parts By Mass) | Rubber-Containing Polymer (A) | Rubber-Containing Multistage Polymer (I) | 80 | 80 | 80 | 80 |
|  |  | Rubber-Containing Multistage Polymer (II) | 10 | 10 | 10 | 10 |
|  | Phosphorus-Based Antioxidant (B) Having Alkyl Group Having 8 or More Carbon Atoms | JP-333E | 0.5 | 0.5 | 0.5 | — |
|  |  | ADK STAB PEP-8 | — | — | — | 0.5 |
|  | Phenolic Antioxidant (C) | ADK STAB AO-60 | 0.5 | — | 1.0 | 0.5 |
|  |  | ADK STAB AO-40 | 0.5 | 1.0 | — | — |
|  | Thermoplastic Polymer (D) | ACRYPET VH | 10 | 10 | — | 10 |
|  |  | ACRYPET MD | — | — | 10 | — |
|  | Additive  Phosphorus-Based Antioxidant | ADK STAB PEP-36 | — | — | — | — |
|  |  | Irgafos 168 | — | — | — | — |
|  | Ultraviolet Absorber | ADK STAB LA-31RG | 1.1 | 1.1 | 1.1 | 1.1 |
|  | Light Stabilizer | Chimassorb 2020 FDL | — | — | — | 1.0 |
| Physical Property | Gel Content [%] |  | 62 | 62 | 62 | 62 |
|  | Melt Flow Rate (M1) [g/10 min] |  | 28 | 26 | 31 | 24 |
|  | MFR Retention Ratio (M2/M1) [—] |  | 1.0 | 1.2 | 1.1 | 0.8 |
|  | MFR Retention Ratio (M3/M1) [—] |  | 1.1 | 1.2 | 1.2 | 0.2 |
|  | Heating Weight Loss (30 min) [%] |  | 3 | 4 | 3 | 3 |
|  | Heating Weight Loss (60 min) [%] |  | 33 | 39 | 8 | 6 |

TABLE 3-3

|  |  |  | Comparative Example 1 | Comparative Example 2 | Comparative Example 3 | Comparative Example 4 | Comparative Example 5 |
|---|---|---|---|---|---|---|---|
| Thermoplastic Resin Composition (Parts By Mass) | Rubber-Containing Polymer (A) | Rubber-Containing Multistage Polymer (I) | 80 | 80 | 80 | 55 | 80 |
|  |  | Rubber-Containing Multistage Polymer (II) | 10 | 10 | 10 | — | 10 |
|  | Phosphorus-Based Antioxidant (B) Having Alkyl Group Having 8 or More Carbon Atoms | JP-333E | — | — | — | — | 0.5 |
|  |  | ADK STAB PEP-8 | — | — | — | — | — |
|  | Phenolic Antioxidant (C) | ADK STAB AO-60 | — | 0.5 | 0.5 | — | 0.5 |
|  |  | ADK STAB AO-40 | — | — | — | — | — |
|  | Thermoplastic Polymer (D) | ACRYPET VH | 10 | 10 | 10 | 45 | — |
|  |  | ACRYPET MD | — | — | — | — | — |
|  | Hydroxyl Group-Containing Polymer | Hydroxyl Group-Containing Polymer (I) | — | — | — | — | 10 |
|  | Additive  Phosphorus-Based Antioxidant | ADK STAB PEP-36 | — | 0.5 | — | — | — |
|  |  | Irgafos 168 | — | — | 0.5 | — | — |

TABLE 3-3-continued

|  |  | Comparative Example 1 | Comparative Example 2 | Comparative Example 3 | Comparative Example 4 | Comparative Example 5 |
|---|---|---|---|---|---|---|
|  | Ultraviolet Absorber ADK STAB LA-31RG | 1.1 | 1.1 | 1.1 | 1.1 | 1.1 |
|  | Light Stabilizer Chimassorb 2020 FDL | — | 1.0 | 1.0 | — | 1.0 |
| Physical | Gel Content [%] | 63 | 62 | 62 | 38 | 66 |
| Property | Melt Flow Rate (M1) [g/10 min] | 10 | 13 | 12 | 28 | 0.3 |
|  | MFR Retention Ratio (M2/M1) [—] | 0.5 | 0.3 | 0.5 | 1.0 | 0.0 |
|  | MFR Retention Ratio (M3/M1) [—] | 0.5 | 0.0 | 0.3 | 1.2 | — |
|  | Heating Weight Loss (30 min) [%] | 59 | 3 | 4 | 73 | 3 |
|  | Heating Weight Loss (60 min) [%] | 66 | 8 | 9 | 80 | 7 |

The additives used in Table 3-1 to Table 3-3 are as follows.

ADK STAB PEP-36: phosphorus-based antioxidant (having no alkyl group having 8 or more carbon atoms), CAS-No.: 80693-00-1, chemical name: 3,9-bis(2,6-di-tert-butyl-4-methylphenoxy)-2,4,8,10-tetraoxa-3,9-diphosphaspiro[5.5]un decane Irgafos 168: phosphorus-based antioxidant (having no alkyl group having 8 or more carbon atoms), CAS-No.: 31570-04-4, chemical name: tris(2,4-di-tert-butylphenyl)phosphite The above examples and comparative examples revealed the following. When the phosphorus-based antioxidant (B) having an alkyl group having 8 or more carbon atoms was contained, the melt flow rate (M1) as an index of fluidity and the MFR retention ratio (M2/M1) as an index of thermal stability were good (Example 1 to 9). When the phenolic antioxidant (C) was further added, the heating weight loss (30 min) was further improved (Examples 2 to 9). Meanwhile, when the phosphorus-based antioxidant (B) having an alkyl group having 8 or more carbon atoms was not contained, the melt flow rate (M1) as an index of fluidity or the MFR retention ratio (M2/M1) as an index of thermal stability was poor. Moreover, even when the phenolic antioxidant (C) was not contained, the heating weight loss (30 min) was poor (Comparative Examples 1 to 3). In addition, when the gel content was lower than 40% by mass, the melt flow rate (M1) and the MFR retention ratio (M2/M1) were good even when the phosphorus-based antioxidant (B) was not contained, and it can be said that the problem regarding fluidity and thermal stability did not exist in the first place (Comparative Example 4). Furthermore, in the case of using a hydroxyl group-containing polymer, the melt flow rate was greatly lowered, making it impossible to provide a resin composition with good fluidity (Comparative Example 5).

INDUSTRIAL APPLICABILITY

In the thermoplastic resin composition of the present invention, the fluidity and thermal stability during molding are high, so that the melt viscosity can be kept low and thus the residence in the molding machine is small. As a result, it is possible to suppress the thermal degradation of the resin. When the resultant molded body is a film, unfavorable situations are unlikely to occur such as increase of defects called fish eyes due to thermally degraded products over time, and thus it is possible to perform melt extrusion such as film molding over a long period of time. Furthermore, by reducing contaminants, it is possible to provide an acrylic resin film which is excellent in appearance design and can be applied to various applications.

What is claimed is:

1. A thermoplastic resin composition having a gel content of 40% by mass or more, comprising:
    a rubber-containing polymer (A) which is an acrylic resin; and
    a phosphorus-based antioxidant (B) having an alkyl group having 8 or more carbon atoms, wherein
    a melt flow rate (M1) for a retention time of 4 minutes measured in accordance with JIS K7210 under conditions of a temperature of 280° C. and a load of 49 N is 20 [g/10 min] or more.

2. The thermoplastic resin composition according to claim 1, wherein an MFR retention ratio (M2/M1), which is a ratio of a melt flow rate (M2) for a retention time of 30 minutes, is 0.8 to 1.2.

3. The thermoplastic resin composition according to claim 1, wherein an MFR retention ratio (M3/M1), which is a ratio of a melt flow rate (M3) for a retention time of 60 minutes, is 0.8 to 1.2.

4. The thermoplastic resin composition according to claim 1, further comprising a phenolic antioxidant (C).

5. The thermoplastic resin composition according to claim 1, wherein a heating weight loss (30 min) at 30 minutes after heating to 280° C. in an air atmosphere is 10% by mass or less.

6. The thermoplastic resin composition according to claim 1, wherein a heating weight loss (60 min) at 60 minutes after heating to 280° C. in an air atmosphere is 10% by mass or less.

7. The thermoplastic resin composition according to claim 1, wherein the phosphorus-based antioxidant (B) having an alkyl group having 8 or more carbon atoms is a phosphorus-based antioxidant (B) having no aromatic ring structure.

8. The thermoplastic resin composition according to claim 1, wherein the phosphorus-based antioxidant (B) having an alkyl group having 8 or more carbon atoms is a phosphorus-based antioxidant (B) represented by the following formula (1)

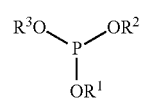

formula (1)

where $R^1$, $R^2$, and $R^3$ each represent an alkyl group having 8 to 18 carbon atoms.

9. The thermoplastic resin composition according to claim 1, further comprising a thermoplastic polymer (D).

10. The thermoplastic resin composition according to claim 1, wherein the thermoplastic resin composition is an acrylic resin composition.

11. A thermoplastic resin molded body obtained from the thermoplastic resin composition according to claim 1.

12. The thermoplastic resin molded body according to claim 11, wherein the thermoplastic resin molded body is a pellet or a film.

13. An acrylic resin film obtained from the thermoplastic resin composition according to claim 1.

* * * * *